Patented Nov. 10, 1931

1,830,906

UNITED STATES PATENT OFFICE

ALBERT JAEGER, OF STADE IN HANOVER, GERMANY, ASSIGNOR TO "HEROLD" AKTIEN-GESELLSCHAFT, OF HAMBURG, GERMANY, A CORPORATION OF GERMANY

PROCESS FOR THE PRODUCTION OF VARNISH AND ENAMEL LIKE COATINGS

No Drawing. Application filed July 2, 1929, Serial No. 375,575, and in Germany December 28, 1927.

It is known to produce varnishes for the preparation of enamel like coatings by combining the liquid phase which occurs first in the condensation of phenol with formaldehyde, generally accompanied by stratification, with solutions of water-glass. If this is done merely by adding water-glass solutions to the liquid phase, then the silicic acid is precipitated. It has already been proposed to avoid this by adding silicic acid, titanium dioxide or metal oxides before or at the same time as the addition of water glass to the liquid condensation phase.

It has now been found that the precipitation of the silicic acid on the mixture of the water-glass with the liquid phase of phenol-formaldehyde condensation may also, and even better, be prevented by adding a protective colloid to the mixture with or before the addition of the water glass. As protective colloids, resin-esters, cellulose esters, artificial resins as swellings or solutions in organic solvents, albuminous substances, gelatinous substances and the like may be added. The process may be performed, for instance, by dissolving the protective colloid in cresol, then adding the liquid phase and finally admixing the water-glass. Such a mixture is then heated as a whole until a drop, brought on to glass, gives a brittle resin. The resins so obtained give coatings of enamel like hardness and tenacity. They dissolve in the usual solvents, such as alcohol, amyl acetate, solvents containing pyridine, hydrogenated phenols, lactic acid esters and the like. The present process is especially important because it presents the possibility of utilizing waste, from the manufacture of artificial materials, which was hitherto useless. As protective colloid, for instance, for the present process use may be made of casein waste, or of such in the form of gelalith waste or finally of the waste from the manufacture of artificial resins or from the mechanical treatment of artificial resins; these may be swollen or dissolved, e. g. in cresol, and then admixed to the liquid phase of phenol formaldehyde condensation and finally waterglass added to the mixture.

The resinous products obtained by the practice of the present invention are capable of hardening into tough, hard enamel like coatings which may be improved after evaporation of the solvent by hardening at comparatively low temperatures.

I claim:—

1. Process for the production of varnishes capable of hardening by combining the liquid phase of phenol formaldehyde condensation with water-glass, therein characterized that the combination of water-glass with the liquid phase is performed in the presence of a protective colloid in a quantity sufficient to prevent precipitation of silicic acid.

2. In the process of producing a varnish-like coating capable of hardening, the steps comprising mixing water glass with casein waste and adding the mixture to the liquid phase of phenol-formaldehyde condensation said casein waste being used in a quantity sufficient to prevent precipitation of silicic acid.

3. In the production of a varnish-like coating, the steps comprising combining water glass with the liquid phase of phenol formaldehyde condensation in the presence of a protective colloid selected from the group consisting of resin-esters, cellulose esters, artificial resins, albuminous substances, and gelatinous substances, the colloid being used in a sufficient quantity to prevent precipitation of silicic acid.

4. The process of producing a resinous coating composition comprising mixing water glass in the presence of a protective colloid dissolved in an organic solvent with the liquid phase of phenol formaldehyde condensation, said colloid being used in a sufficient quantity to prevent precipitation of silicic acid, and heating the resulting mixture until a mass is obtained capable of hardening into a resinous product.

DR. ALBERT JAEGER.